United States Patent [19]

Bolte et al.

[11] Patent Number: 5,624,100
[45] Date of Patent: Apr. 29, 1997

[54] DEVICE FOR ACTUATING A CONTROL MEMBER

[75] Inventors: Ekkehard Bolte, Aachen-Waldheim; Bernd Ackermann, Aachen; Leo Bertram, Stolberg, all of Germany

[73] Assignee: U.S. Philips Corporation, New York, N.Y.

[21] Appl. No.: 488,309

[22] Filed: Jun. 7, 1995

[30] Foreign Application Priority Data

Jun. 10, 1994 [DE] Germany .......................... 44 20 369.1
Feb. 9, 1995 [DE] Germany .......................... 195 04 243.3

[51] Int. Cl.$^6$ .................................................. F16K 31/08
[52] U.S. Cl. ................ 251/65; 251/129.01; 251/129.11; 251/285
[58] Field of Search ................... 251/65, 129.01, 251/129.11, 285; 261/65

[56] References Cited

U.S. PATENT DOCUMENTS

| | | | |
|---|---|---|---|
| 2,097,409 | 10/1937 | Wertz | 261/65 |
| 4,200,596 | 4/1980 | Iiyama et al. | 251/285 |
| 4,580,761 | 4/1986 | Silcox et al. | 251/65 |
| 5,139,230 | 8/1992 | Lester | 251/285 |

FOREIGN PATENT DOCUMENTS

| | | | |
|---|---|---|---|
| 0375050 | 6/1990 | European Pat. Off. . | |
| 0221088 | 12/1983 | Japan | 251/129.11 |
| 9002870 | 3/1990 | WIPO . | |

Primary Examiner—Edward K. Look
Assistant Examiner—Christopher Verdier
Attorney, Agent, or Firm—Ernestine C. Bartlett

[57] ABSTRACT

A throttle valve in a gas conduit (3), such as for example an intake of an internal-combustion engine, is pivotable from an idling position into operating positions by means of a valve shaft (5), the valve shaft (5) carrying an actuator body formed by a magnetised rotor body (9) which, via an air gap (10), cooperates with pole shoes (15) of a stationary excitation section (11), which is electrically energisable by a pick-up, which pole shoes surround said rotor body externally, the excitation section (11) comprising a U-shaped stator whose limbs (12a, 12b) form the pole shoes (15), which cooperate with the permanent-magnet rotor body (9) at the air gap, in such a manner that the rotor body (9) is subjected to magnetic torques which tend to pull said rotor body into a well-defined rest position, in order to thereby return the throttle valve (4) in a direction opposite to the opening direction into a well-defined rest position in the non-energised condition.

20 Claims, 5 Drawing Sheets

DEVICE FOR ACTUATING A CONTROL MEMBER

BACKGROUND OF THE INVENTION

The invention relates to a device for actuating a control member, particularly a throttle valve in a gas conduit, such as for example an intake of an internal-combustion engine, which valve is pivotable from an idling position into operating positions by means of a valve shaft, the valve shaft carrying an actuator body comprising a magnetised rotor body which, via an air gap, cooperates with pole shoes of a stationary excitation section, which is electrically energisable by a regulator, which pole shoes surround said rotor body externally.

EP 0.375.050 B1 describes a device for actuating a control member, which can be controlled by an electrical regulator. The control member is, for example, a throttle valve of the engine of a motor vehicle, which valve is mounted on a valve shaft. The valve shaft carries an actuator body in the form of a magnetized rotor body having two poles. The permanent-magnetic rotor body is cylindrical and cooperates with an excitation section having three pole shoes which surround the rotor body so as to form an air gap. The pole shoes carry windings by which they are energized and which are each powered and controlled separately. In this way the throttle valve can be controlled in an accurately defined manner. When the windings are not energized a mechanical spring force ensures that the throttle valve is reset to a well-defined rest position. The construction and operation of the known device are also complicated, particularly owing to the fact that three currents have to be controlled and an additional mechanical reset mechanism.

SUMMARY OF THE INVENTION

It is an object of the invention to provide a device of the type defined in the opening paragraph, whose construction and operation are simpler, thus also enabling the control means to be simplified.

According to the invention this object is achieved in that the excitation section comprises a U-shaped stator whose limbs form the pole shoes, which cooperate with the permanent-magnet rotor body at the air gap in such a manner that the rotor body is subjected to magnetic torques which tend to pull said rotor body into a well-defined rest position, in order to thereby return the throttle valve in a direction opposite to the opening direction into a well-defined rest position in the non-energised condition.

This enables mechanical reset mechanisms to be dispensed with. A simple construction is obtained.

A first embodiment of the invention is constructed in such a manner that the excitation section comprises a U-shaped stator whose limbs form the pole shoes, which owing to a non-uniform shape produce a strong detent torque, which tends to pull the rotor body into a preferential rest position determined by the detent torque. In the case of an appropriate dimensioning a mechanical reset mechanism can be dispensed with completely.

The deliberate use of the detent torque for setting the rest position distinctly simplifies the mechanical construction and the electrical control of the control member. The control member may be the throttle valve in a conduit which conveys a gaseous or liquid medium in a motor vehicle. This may be particularly the throttle valve in the intake conduit of an internal-combustion engine such as an Otto-cycle or diesel engine. The magnetic rotor body may be of the permanent-magnet type or of the electrically magnetisable type.

In a variant of the invention the width of the air gap differs along the pole arcs of the pole shoes in such a manner that narrow and wide air gap portions alternate with one another, the narrow and wide air gap portions being each time disposed diametrally opposite one another. In the case of failure of the electrical excitation this ensures that a well-defined rest position is reached, which is variable at option within a given range. The magnetic field producing the detent torque can be utilised selectively in conjunction with a two-pole magnet.

In another variant of the invention the spaced-apart facing pole shoes define gaps between the respective limbs or pole shoe ends, and the pole shoes have slob substantially in the centre of their pole arcs at the air gap, the slob in the pole arcs magnetically influencing the detent torque variation to substantially the same extent as the gaps between the pole shoe ends. The gaps between the limbs can thus be enlarged to facilitate the introduction of the winding wire.

In a further variant of the invention auxiliary, slots may be provided at the periphery of the slots in the pole arcs.

In a further variant of the invention the detent torque is assisted by an additional magnetic reset mechanism. This increases the effect of the reset torque, which corresponds to the sum of the detent torque and the auxiliary torque of the auxiliary magnets. The reset mechanism may be, for example, a separately constructed mechanism with auxiliary magnets. However, the auxiliary magnets may alternatively be provided in or at the edges of the pole arcs at a smaller distance from the rotor body, i.e. forming a narrower air gap or may be mounted in the slots of the pole arcs. This measure serves to extend the actuator range and to provide a rest position which differs from the first rest position. The step of providing the auxiliary magnets in or at the edges of the pole arcs at a smaller distance from the rotor body has the additional advantage that a separate reset mechanism may be dispensed with.

In a second embodiment of the invention the excitation section comprises a U-shaped stator having parallel limbs forming pole shoes, the ends of the pole shoes being spaced from one another and the pole shoes at the air gap having slots in which permanent-magnet bodies are mounted, which permanent-magnet bodies form a reset mechanism and produce a magnetic flux having such a strength and direction that in its rest position the magnetised rotor body situated in the space surrounded by the pole shoes is oriented in the direction of the magnetic flux of the magnet bodies. In this embodiment an additional reset mechanism may also be dispensed with.

If in a variant of this second embodiment of the invention the slots are formed substantially in the central areas of the pole shoes and produce a diametral magnetic field in the air gap, this has the advantage that the torques are symmetrised. Moreover, this results in a favourable position between reset torque and electromagnetic torque.

In a further variant of this second embodiment the width of the air gap is substantially constant at the location of the pole shoes. This results in a simple pole shoe shape. Moreover, no more attention is to be paid to the detent torque.

In a further variant of the invention there is provided a mechanical stop, which defines the rest position when the reset mechanism is used. The rest position can be reliably defined through the provision of this stop. This rest position is the first limp-home position, in which a minimum operation is still possible.

In a further variant of the invention the mechanical stop is adjustable. This makes it possible to adjust the limp-home position.

In a further variant of the invention there is provided a further mechanical stop, which limits the open position of the control member. This may be, for example, the full-throttle position.

In a further variant of the invention at least the stop against which a cam portion of the control member abuts when it returns to the rest position is adjustable. In this way different stop positions are possible and the device can readily be adapted to different conditions of use.

In a further variant of the invention at least the stop for the rest position has an abutment portion provided at the end of a set-screw, which can be locked and which can be adjusted from the exterior of the housing, which abutment portion may consist of alternative materials having different damping characteristics. Thus, it is possible to use stop elements for hard and soft damping. A hard stop may consist of, for example, steel and a soft stop may consist of, for example, silicone rubber.

In a further variant of the invention the set-screw is constructed to provide damping between the abutment portion and the screw body. Such a damping is capable of additionally absorbing severe shocks.

In a further variant of the invention the set-screw is adjustably mounted in a threaded bore of the stop, the stops forming parts of the housing. This provides an economical construction.

In a further variant of the invention the stops are optionally arranged at the location of one of the two bearings of the control member. If the stops are arranged, for example, at the side of the control member which is remote from the rotor body, the housing construction can be simplified.

In a further variant of the invention relative to the zero position in which the control member closes the intake the stop defining the rest position is situated at that side which is opposed to the opening direction and, in addition, the detent torque and the additional reset mechanism are adapted to one another in such a manner that in a failure situation, for example in the case of power failure and failure of the additional reset mechanism, the rest position which is mechanically defined by the stop is no longer reached but a limp-home position without mechanical stop is reached, which limp-home position deviates from the zero position by an angle of rotation in the opening direction similar to that defined by the mechanical stop which defines the rest position in the opposite direction relative to the zero position. Thus, it is achieved that in the event of a simultaneous failure of the electrical drive and the additional reset mechanism operation is possible in an emergency mode which differs only slightly from the emergency operation in the rest position reached in the case of failure of the electrical actuation alone. This provides a substantial improvement of the reliability.

In a further embodiment of the invention the torque for magnetically resetting the control member to the rest position by means of the internal detent torque and the torque provided by the additional reset mechanism is such that operation with the required dynamic range can also be obtained without a torque which acts in the closing direction and which is produced by electrical energisation. This considerably simplifies the electrical drive circuit because the electrically produced torque should now only act in the opening direction. Instead of a full bridge arrangement with four active power switches a unipolar arrangement with one active switch can be used. Apart from the electronic components thus saved this eliminates the voltage drop across the second switch, which is very annoying in the case of low-voltage operation.

BRIEF DESCRIPTION OF THE DRAWING

In the drawing:

FIG. 1 shows a part of an intake port 1 in the intake conduit of, for example, an internal combustion engine. A throttle valve 4 is mounted in the inner space 3 of the tubular port 1. The throttle valve 4 is mounted on a valve shaft 5 which extends diametrally through the tubular inner space 3. The valve shaft 5 is journalled in a flange 6 of the port 1 by means of bearings 7.

Figure 1:
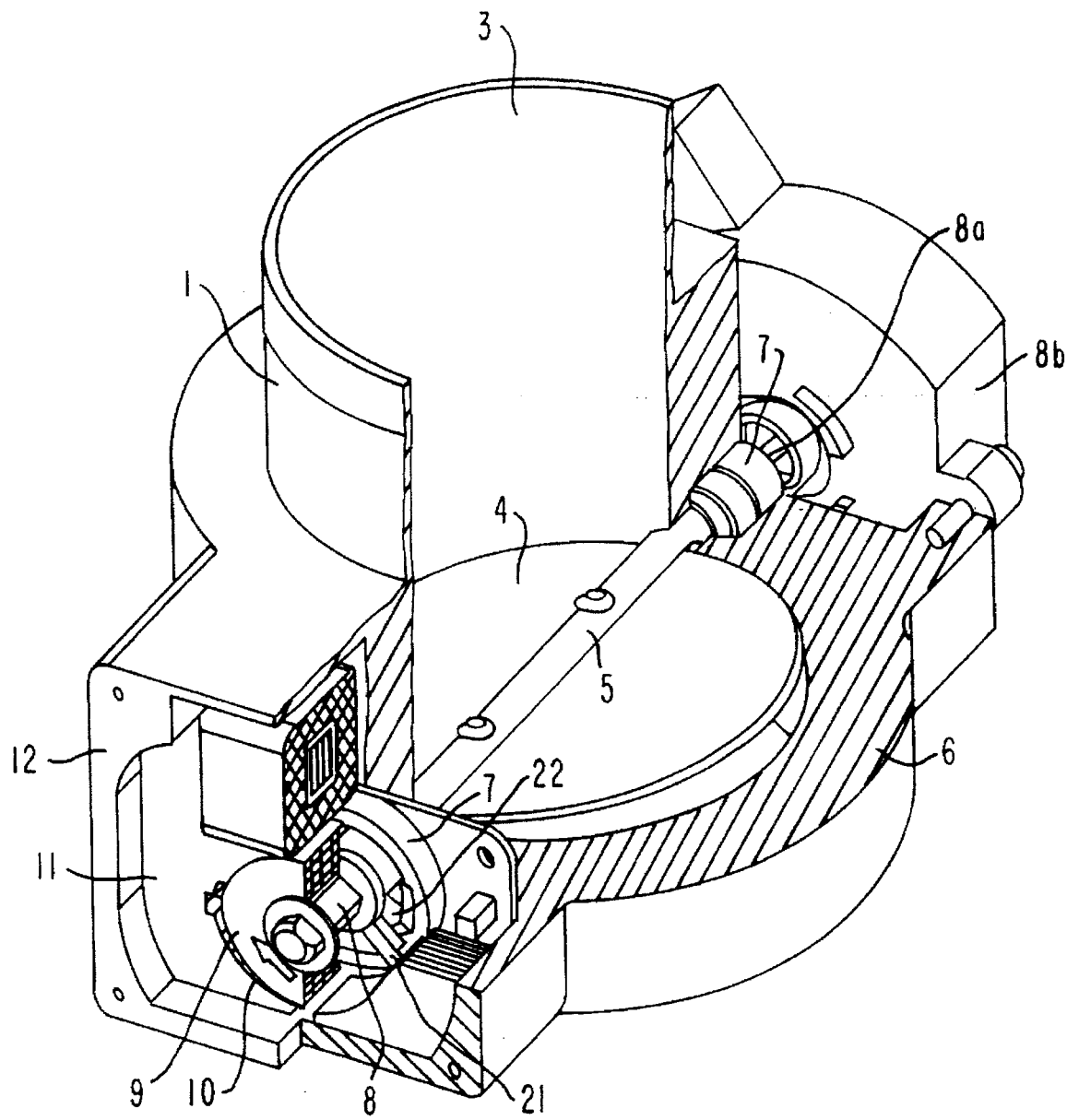
FIG. 1 is a diagrammatic partly sectional view showing the intake port of a an internal combustion engine with a throttle valve and a device for actuating the throttle valve.

The valve shaft 5 has one external shaft end 8 carrying a cylindrical magnetic rotor body 9. The other shaft end 8a carries a position sensor 8b.

The magnetic rotor body 9 is to be understood to mean a rotatable member which is capable of rotation in an air gap 10 and which is of the permanent-magnet type or is electrically magnetisable. In the present embodiment a permanent-magnet rotor body is preferred. The permanent-magnet rotor body 9 is disposed in the air gap 10 of an excitation section 11 accommodated in a housing 12 of the flange 6.

Figure 2:
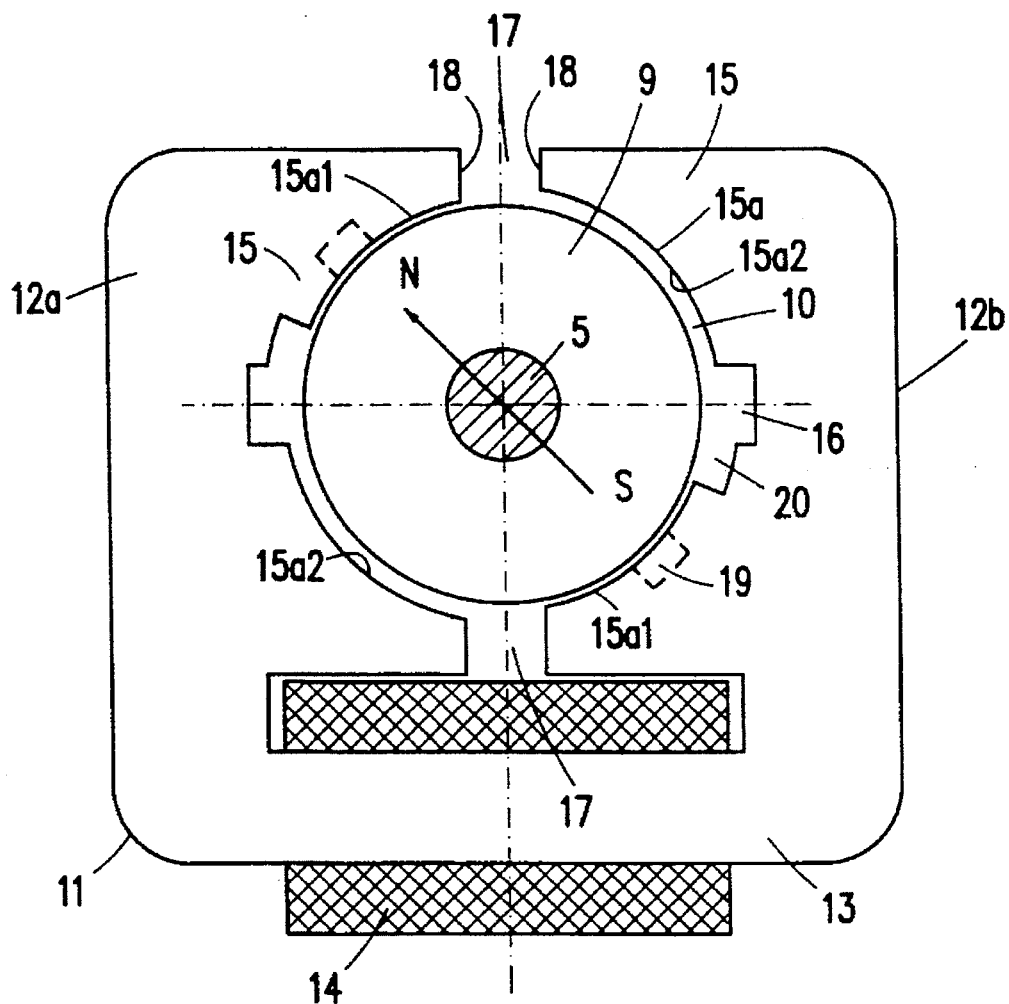
FIG. 2 is a sectional view of the device for actuating the throttle valve.

FIG. 2 is a sectional view showing the permanent-magnet rotor body 9 and the excitation section 11 in the non-energised condition. The permanent-magnet body 9 has two poles, i.e. a north pole N and a south pole S. The excitation section 11 is made of a high-permeability material such as iron, steel, sintered iron or of magnetic-steel laminations and it is U-shaped with two limbs 12a and 12b interconnected by a base 13. The base 13 carries an excitation winding 14 between the limbs 12a, 12b.

Both limbs 12a, 12b are constructed as pole shoes 15 having pole arcs 15a, which externally bound the air gap 10. These pole arcs 15a are interrupted by slots 16 substantially in their centres. These slots 16 have substantially the same magnetic effect as the gaps 17 between facing pole shoe ends 18. This results in diametrally opposed pole arc portions 15a1 and 15a2 at opposite sides of the central slots 16. The air gap 10 has different non-constant widths. Between the pole-arc portion 15a1 and the rotor body 9 this air gap is on the average smaller than between the pole-arc portion 15a2 and the rotor body 9, assuming that the rotor body 9 is circularly cylindrical with a constant diameter.

The rotor body 9 and the excitation section 11 have been dimensioned so as to obtain a device with a large detent torque. This large detent torque is promoted by the shape of the air gap. If required, the detent torque can also be increased by slot extensions 20. In the rest condition, i.e. with the coil 14 not energised, the rotor body 9 assumes the desired position in accordance with its magnetisation at the location of the pole-arc portions 15a1, which position corresponds to the minimum-reluctance position. This position is a so-called second limp-home position $\phi_{2lh}$, in which operation an emergence operation is possible.

Auxiliary magnets 19, which may be arranged in the slots 16 or in the areas of the pole-arc portions 15a1 and 15a2, can be used to increase the resetting effect of the detent torque. The auxiliary magnets 19 are arranged at appropriate locations in accordance with the required specifications. The auxiliary magnets enable a first limp-home position $\phi_{1h}$ to be reached, which will be described in more detail with reference to FIG. 3.

When the winding 14 is energised the rotor body 9 is moved and at the same time the throttle valve 4 is moved in the direction of its maximum open position $S_{op}$, opposed by the magnet reset forces. The detent torque, which counteracts this movement towards the open position, constantly tends to pull the rotor body 9 back in the closing direction. Thus, a mechanism having a reset action is obtained without the use of a return spring. As a result, the device becomes very simple both mechanically and electrically.

It is possible to provide a mechanical stop 21 in the first limp-home position $\phi_{1h}$, against which stop the rotor body 9 can abut when it returns. Moreover, an additional magnetic spring 22, which is not described here in detail, may be used instead of the auxiliary magnet 19, which has been provided to assist the detent torque or to extend the actuator range.

Figure 3:
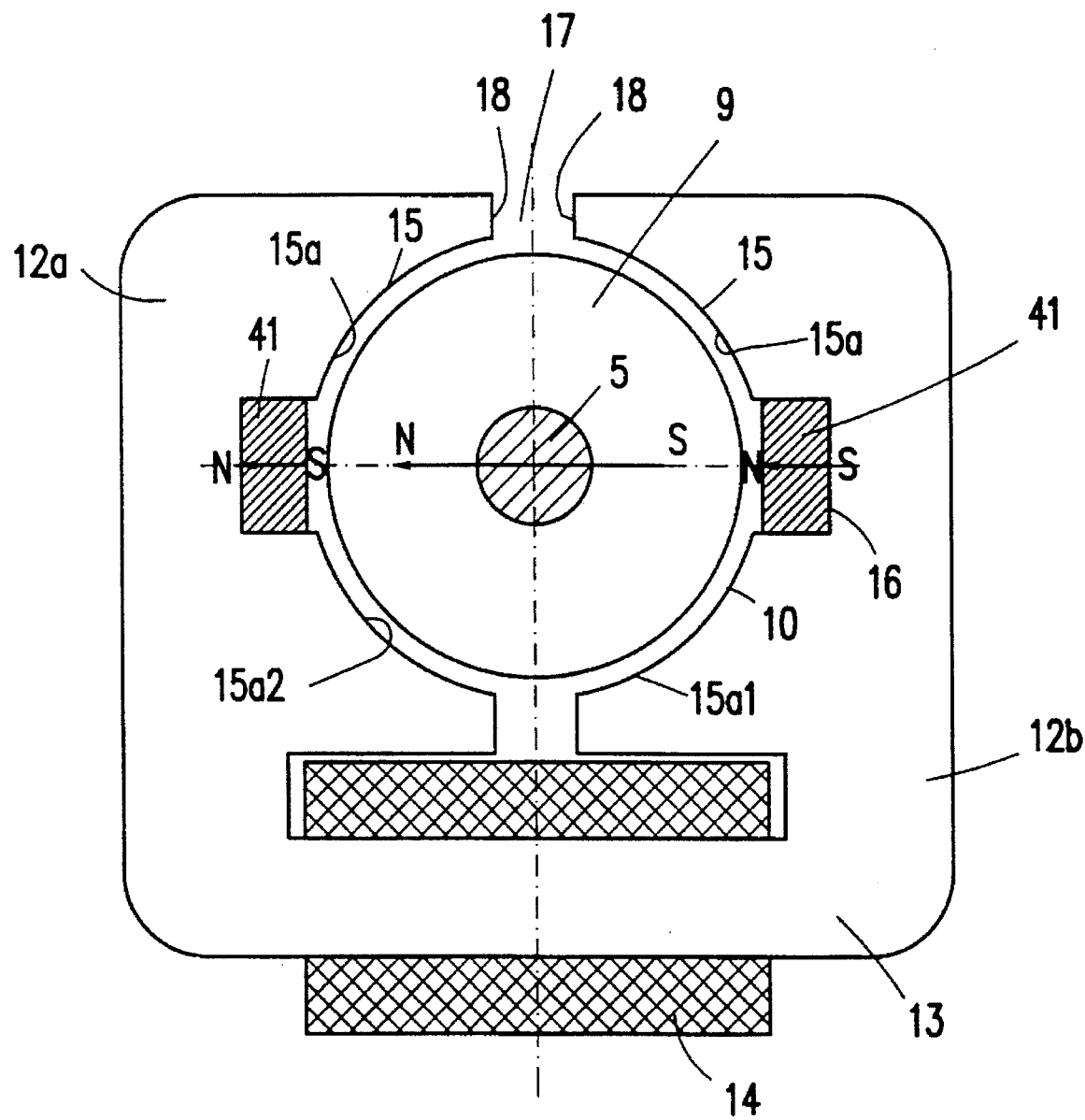
FIG. 3 shows a second embodiment of the device of FIG. 5, for which no allowance is to be made for the detent torque.

FIG. 3 shows a modified second embodiment of the actuating device. The pennanent-magnet rotor body 9 and the excitation section 11 are again shown in sectional view in the non-energised condition. The pennanent-magnet body 9 has two poles, i.e. a north pole N and a south pole S. The excitation section 11 is made of a high-permeability material such as iron, steel, sintered iron or of magnetic-steel laminations and it is U-shaped with two limbs 12a and 12b interconnected by a base 13. The base 13 carries an excitation winding 14 between the limbs 12a, 12b.

Both limbs 12a, 12b are constructed as pole shoes 15 having pole arcs 15a, which externally bound the air gap 10. These pole arcs 15a are interrupted by slots 16 substantially in their centres. In these slots 16 pennanent-magnet bodies 41 are mounted. The pennanent-magnet bodies 41 are magnetised diametrally. This results in diametrally opposed, identically shaped pole arc portions 15a1 and 15a2 at opposite sides of the central slots 16. The air gap 10 has a constant width at the location of the pole shoes 15.

The pennanent-magnet bodies 41 form a reset mechanism 19a and produce a magnetic flux having such a strength and direction that in its rest position the magnetised rotor body 9 situated in the space surrounded by the pole shoes is oriented in the direction of the magnetic flux of the magnet bodies 41. In this embodiment the detent torque may be ignored in a first approximation.

Figure 4:
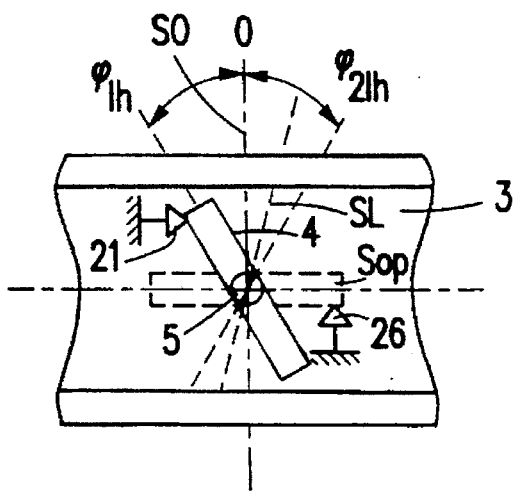
FIG. 4 is a sectional view showing the intake port with the throttle valve to define the angular positions of the throttle valve.

FIG. 4 shows the throttle valve 4 with its valve shaft 5 in the inner space 3 of the intake port 1. The maximum operating range of the throttle valve 4 is $90°+\phi_{1h}$.

The throttle valve has live special positions, shown in FIG. 4. These positions are:

1. The zero position $S_o$, m which the throttle valve 4 extends perpendicularly to the longitudinal direction of the inlet port 1. The flow of gas is interrupted then.

2. The open position $S_{op}$, in which the throttle valve 4 extends in the longitudinal direction of the inlet port 1. This is the full-throttle position.

3. The first limp-home position $\phi_{1h}$, which is assumed by the throttle valve 4 under the influence of the auxiliary magnet or the magnetic spring 22 in the case of failure of the energisation.

4. The idling position SL.

5. The second limp-home position $\phi_{2lh}$, which is assumed by the throttle valve in the event of failure of the energisation and of the auxiliary magnet or the magnetic spring.

The limp-home positions allow driving in an emergency mode.

The detent torque and/or an additional magnetic spring torque are so dimensioned that a return into the first limp-home position $\phi_{1h}$ i.e. against the stop 21, is obtained under the influence of both mechanisms in the non-energised state. With a suitable dimensioning the detent torque alone will be capable of pulling the rotor body 9 and hence the throttle valve 4 into the second limp-home position $\phi_{2lh}$ in the case of failure of the additional auxiliary magnet or the magnetic spring.

Figure 5:
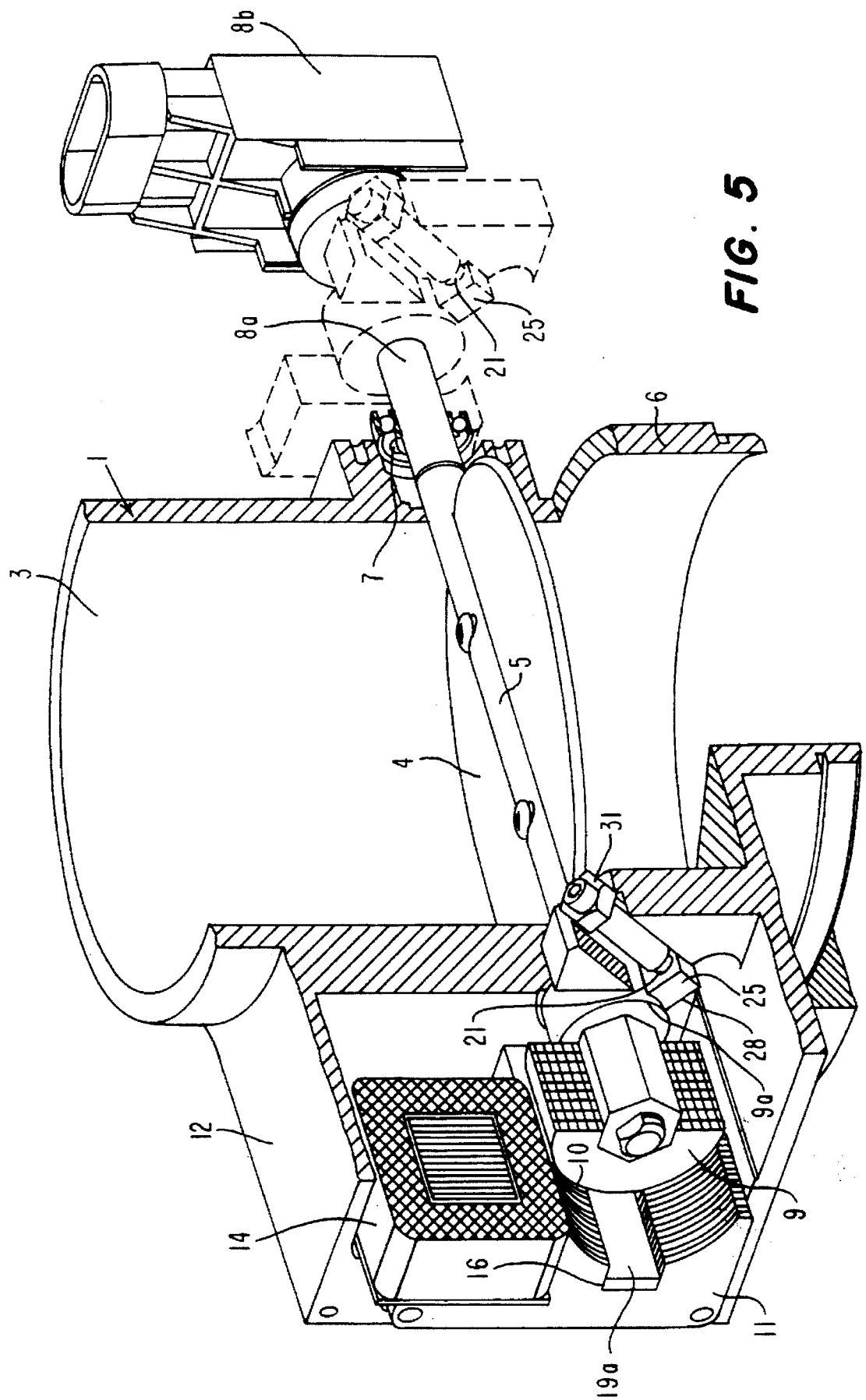
FIG. 5 shows diagrammatically a variant of the invention, the throttle valve being shown in the rest position, in which a cam of the throttle valve has abutted against a stop which defines the rest position.

FIG. 5 again shows a part of the inlet port 1. The throttle valve 4 is mounted in the inner space 3 of the tubular port 1. The throttle valve 4 is mounted on a valve shaft 5 which extends diametrally through the tubular inner space 3. The valve shaft 5 is journalled in a flange 6 of the port 1 by means of bearings 7.

The valve shaft 5 carries a cylindrical magnetic rotor body 9 disposed in the air gap 10 of the excitation section 11, which is arranged in the housing 12 of the flange 6.

A cam body 9a is secured to a side surface of the rotor body 9 and carries a cam 25, which has abutted against the stop 21. In this situation, in which the cam 25 has engaged against the stop 21, the throttle valve 4 is in its rest position or first limp-home position $\phi_{1h}$, which it assumes immediately if the energisation fails. This may be achieved with the aid of the additional magnetic spring, which in the present example comprises auxiliary magnets 19a mounted in the slots 16.

Figure 6:
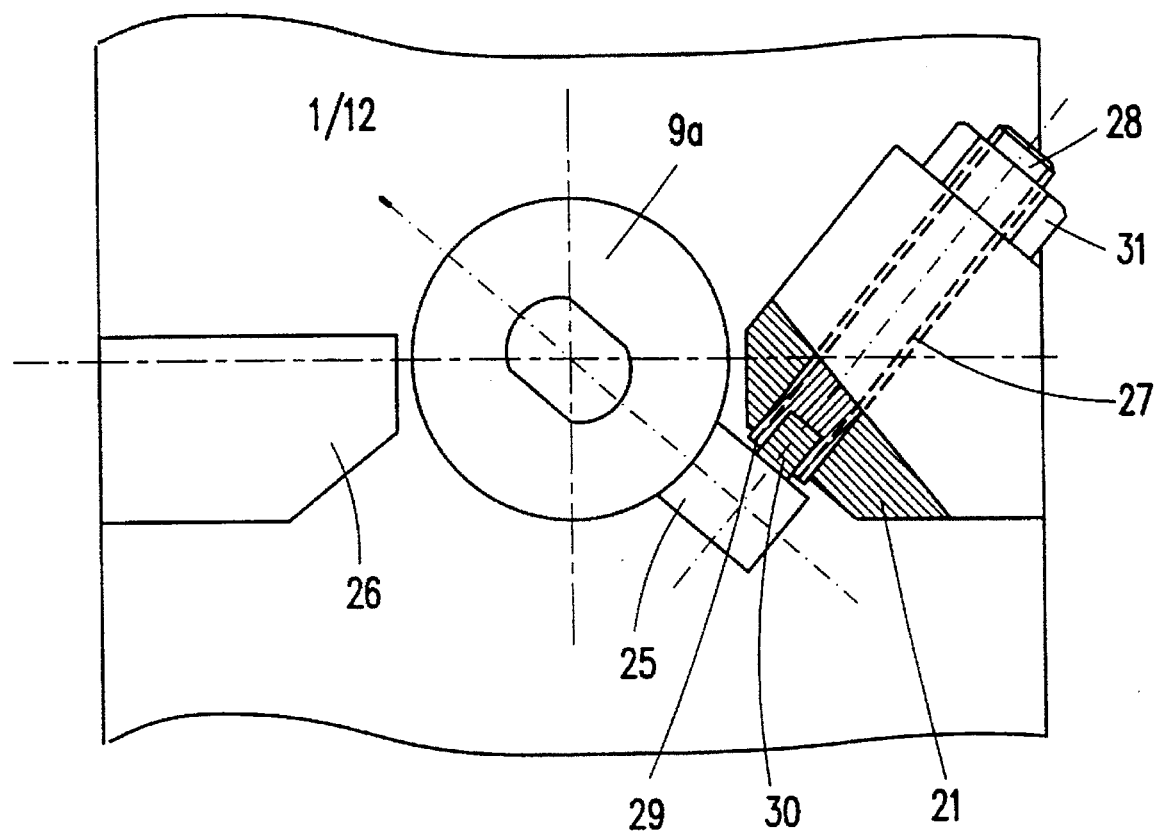
FIG. 6 is a sectional view of the device, of FIG. 5, showing a set-screw of the device which defines the stop point in the rest position and is of a special construction so as to form a damping stop.

FIG. 6 shows two stops 21 and 26 on the housing 12, which is an integral part of the port 1. The stop 21 is the stop for the limp-home position $\phi_{1h}$ and the stop 26 is the stop for the position $S_{op}$ in which the throttle valve 4 is fully open, the stop 21 has a threaded bore 27 in which a set-screw 28 is fitted. At its end 29 which cooperates with the stop 21 the set-screw 28 has an abutment portion 30, which may consist of steel to form a hard stop or of silicone rubber to form a soft stop. The set-screw 28 can be locked in a desired position by means of a lock nut 31.

Figure 7:
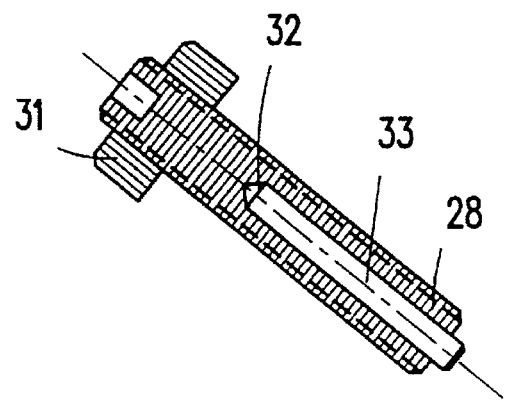
FIG. 7 shows a set-screw adapted to provide damping.

In order to obtain a satisfactory damping the set-screw 28 is, for example, hollow (FIG. 7). A pin 33 is mounted in the bore 32 with such a fit that the energy of the abutting cam 25 is taken up by the friction between the set-screw 28 and the pin 33.

For the construction of the die for the housing 1/12 it may be unfavourable to arrange the stops 21 and 26 adjacent the excitation section 11/14. As a variant the stop mechanism may therefore be arranged at that side of the throttle valve which is remote from the excitation section 11/14, as is shown in broken lines in FIG. 5.

We claim:

1. A device for actuating a throttle valve (4) in a gas conduit (3), which valve is pivotable from an idling position into operating positions by means of a valve shaft (5), the valve shaft (5) carrying an actuator body comprising a magnetic rotor body (9) which body, via an air gap (10), cooperates with spaced-apart facing pole shoes (15) of a stationary excitation section (11) which is electrically energizable by a regulator and which pole shoes surround said rotor body, characterized in that the excitation section (11) comprises a U-shaped stator whose limbs (12a and 12b) form the pole shoes (15) which, owing to a non-uniform shape, produce a strong detent torque which tends to pull the rotor body (9) into a preferential rest position determined by the detent torque and in that the pole shoes (15) define gaps (17) between the respective limbs (12a, 12b) or pole shoe ends (18) and the pole shoes (15) have slots (16) substantially in the center of pole arcs at the air gap.

2. A device as claimed in claim 1, characterised in that the width of the air gap (10) differs along the pole arcs (15a) of the pole shoes in such a manner that narrow and wide air gap portions (15a1 and 15a2) alternate with one another, the narrow and wide air gap portions (15a1 and 15a2) being each time disposed diametrally opposite one another.

3. A device as claimed in claim 1, characterised in that the slots (16) in the pole arcs (15) magnetically influence the detent torque variation to substantially the same extent as the gaps (17) between the pole shoe ends (18).

4. A device as claimed in claim 3, characterised in that auxiliary slots (20) are provided at the periphery of the slots (16) in the pole arcs (15).

5. A device as claimed in claim 1, characterised in that the detent torque is assisted by an additional magnetic reset mechanism (22).

6. A device as claimed in claim 5, characterised in that the reset mechanism (22) comprises auxiliary magnets (19a) mounted in the slots (16).

7. A device as claimed in claim 5, characterized in that the reset mechanism (22) comprises auxiliary magnets (19) provided in or at the edges of pole arc portions (15a1 and 15a2), the distance of the pole are portions from the rotor body (9) being smaller for the auxiliary magnets (19) provided at one of said pole arc portion (15a1) than for the auxiliary magnets (10) provided at another of said pole are portions (15a2).

8. A device as claimed in claim 1, characterised in that the excitation section (11) limbs (12a, 12b) forming the pole shoes (15) are parallel and the slots (16) have permanent-magnet bodies (41) mounted therein, which pennanent-magnet bodies form a reset mechanism (19a) and produce a magnetic flux having such a strength and direction that in its rest position the magnetised rotor body situated in the space surrounded by the pole shoes is oriented in the direction of the magnetic flux of the magnet bodies (41).

9. A device as claimed in claim 8, characterised in that the slots (16) are produce a diametral magnetic field in the air gap.

10. A device as claimed in claim 8, characterised in that the width of the air gap is substantially constant at the location of the pole shoes (15).

11. A device as claimed in claim 10, characterised in that there is provided a further mechanical stop (26), which limits an open position ($S_{op}$) of the control member (4).

12. A device as claimed in claim 1, characterised in that there is provided a mechanical stop (21), which defines the rest position $\phi_{1h}$ when a reset mechanism (19, 19a, 22) is used.

13. A device as claimed in claim 12, characterised in that at least the stop (21) against which a cam (25) abuts when its returns to the rest position is adjustable.

14. A device as claimed in claim 13, characterised in that at least the stop (21) for the rest position ($\phi_{1h}$) has an abutment portion (30) provided at the end of a set-screw (28), which can be locked and which can be adjusted from the exterior of a housing of the valve (1/12).

15. A device as claimed in claim 14, characterised in that the abutment portion (30) alternatively consists of materials having different damping characteristics.

16. A device as claimed in claim 14, characterised in that the set-screw (28) is constructed to provide damping between the abutment portion (30) and the screw body.

17. A device as claimed in claim 14, characterised in that the set-screw (28) is adjustably mounted in a threaded bore (27) of the stop (21).

18. A device as claimed in claim 12, characterised in that the stop (21) forms part of a housing of the valve (1, 12).

19. A device as claimed in claim 12, characterised in that the stop (21) is arranged at the location of one of two bearings (7) of the throttle valve (4).

20. A device as claimed in claim 1, characterised in that relative to a zero position ($S_o$) in which the throttle valve (4) closes the conduit (3) a stop (21) defining the rest position ($\phi_{1h}$) is situated at that side which is opposed to the opening direction of the valve and, in addition, the detent torque and an additional reset mechanism (22) are adapted to one another in such a manner that in a failure situation, in the case of power failure and failure of the additional reset mechanism, the rest position ($\phi_{1h}$) which is mechanically defined by the stop (21) is no longer reached but a limp-home position ($\phi_{2h}$) without the mechanical stop being reached, which limp-home position deviates from the zero position ($S_o$) by an angle of rotation in the opening direction similar to that defined by the mechanical stop (21) which defines the rest position ($\phi_{1h}$) in the opposite direction relative to the zero position.

* * * * *